April 21, 1942.    R. E. SCHOCK    2,280,545
DIODE PHASE DETECTOR
Filed June 18, 1940    2 Sheets-Sheet 1
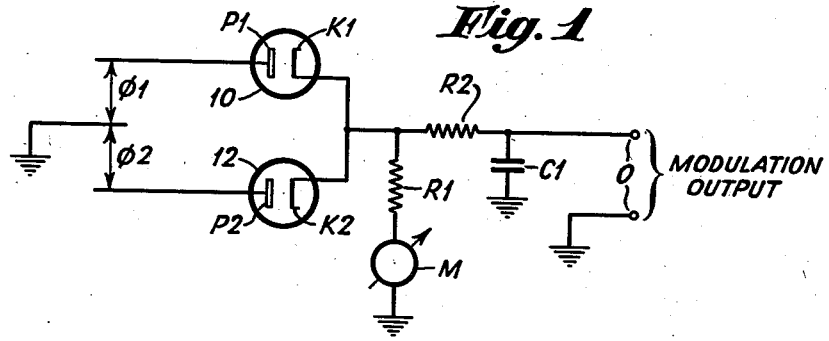
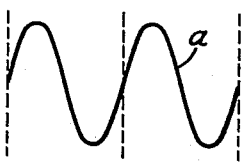
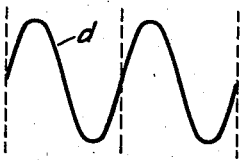
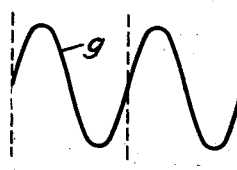
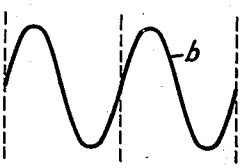
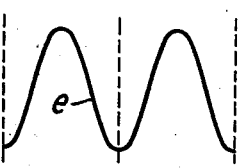
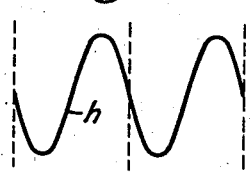
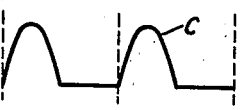
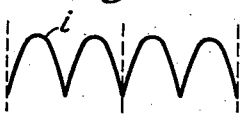
INVENTOR
ROBERT E. SCHOCK
BY H. S. Grover
ATTORNEY April 21, 1942.   R. E. SCHOCK   2,280,545
DIODE PHASE DETECTOR
Filed June 18, 1940   2 Sheets-Sheet 2
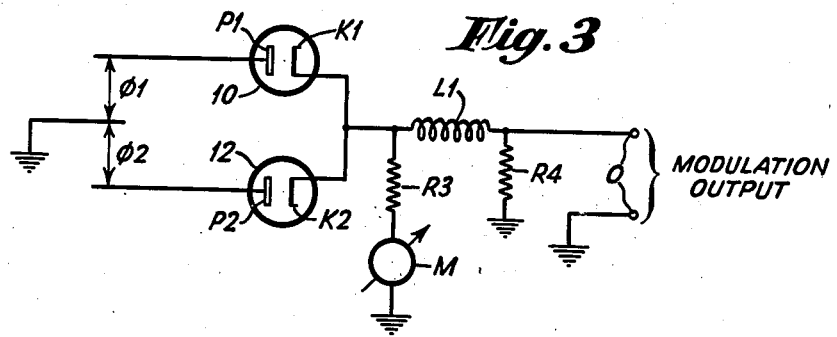
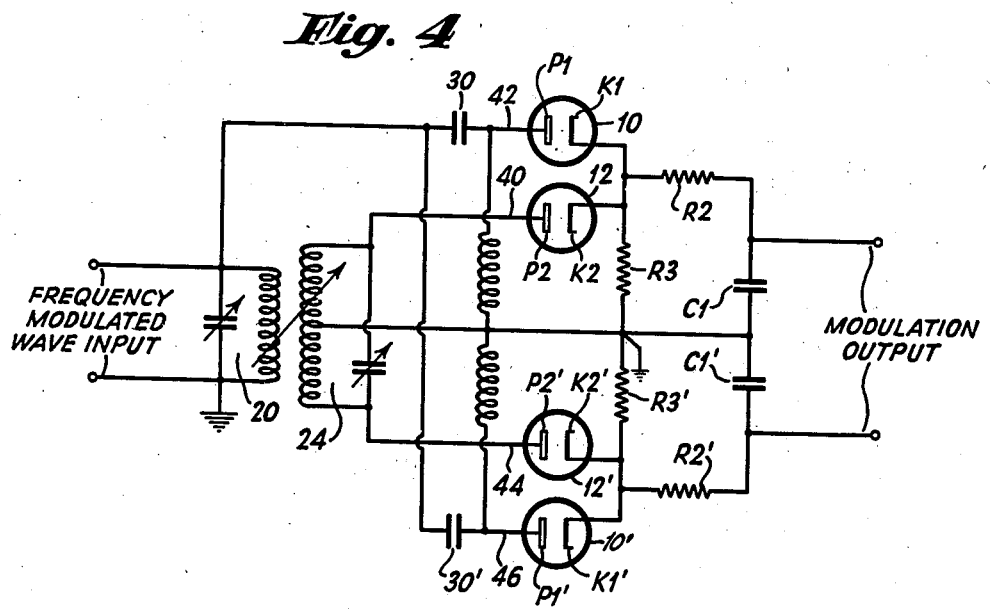
INVENTOR
ROBERT E. SCHOCK
BY
ATTORNEY Patented Apr. 21, 1942

2,280,545

UNITED STATES PATENT OFFICE 2,280,545

DIODE PHASE DETECTOR

Robert E. Schock, Riverhead, N. Y., assignor to Radio Corporation of America, a corporation of Delaware Application June 18, 1940, Serial No. 341,109

8 Claims. (Cl. 250—27)

The present application discloses a new and improved circuit arrangement for the detection of phase difference between two signals of the same frequency. The detector of this arrangement is of wide use in the radio art and is particularly adapted to use in frequency modulated wave demodulators.

In describing my invention, reference will be made to the attached drawings wherein;

Figs. 1 and 3 illustrate modifications of my novel means for detecting the phase relation between two currents or voltages of the same figures;

Figs. 2a to 2i are curves illustrating the operation of my phase detector; while Fig. 4 illustrates the use of my improved detector arrangement in a circuit for detecting the modulations on a frequency modulated wave.

The fundamental operation of this detector may be demonstrated by the circuit of Fig. 1. In this figure, $\phi 1$ and $\phi 2$ represent two signals whose phase relationship it is desired to detect. These signals are as shown impressed between the anode P1 and cathode K1 and anode P2 and cathode K2 of detectors 10 and 12, respectively. The cathodes K1 and K2 of the two diodes 10 and 12 are connected together and feed through a common diode resistor R1 and a direct-current meter M, to ground. Resistance R2 and condenser C1 comprise a low-pass filter through which the detected signal passes to output terminals O.

To demonstrate the operation of the circuit, first assume $\phi 1$ and $\phi 2$ to be in phase as represented by wave forms a and b, Fig. 2a and Fig. 2b. Direct-current pulses of wave form c, Fig. 2c, are then found to be present at the cathodes K1 and K2 and the meter M, Fig. 1, will indicate the average current of these pulses. If the signals $\phi 1$ and $\phi 2$ are 90 degrees out of phase, as represented by wave forms d and e, Figs. 2d and 2e, direct-current pulses of wave form f, Fig. 2f, will result at the cathodes and the average current of these pulses will be greater than it was for the in-phase condition. With $\phi 1$ and $\phi 2$ 180 degrees out of phase, as represented by wave forms g and h, Figs. 2g and 2h, the wave form of the direct-current pulses on the cathodes is then as shown by i, Fig. 2i, and the average current of these pulses in the cathode circuit is still greater than for the zero or 90 degree relationships.

Assuming the two input signals to remain constant in amplitude, the peak voltage of the direct-current pulses in the cathode circuit will remain constant, and leaves only the variation of the average direct-current pulse voltage drop in R1, Fig. 1, which, by the foregoing analysis, was shown to be coincident with phase variation between the incoming signals. In order to be able to make use of the average voltage variations in R1 without destroying the direct-current pulses, a low-pass filter is used which allows the average voltage variations to pass but not the direct-current pulses. In Fig. 1, this filter consists of a resistance R2 and condenser C1 arrangement feeding output terminals O.

The circuit of Fig. 3 is the same as that of Fig. 1 except for the use of an inductance L1 and resistance R4 arrangement of low-pass filter in the output.

The detector of this disclosure may be used as a modulation detector in any system where demodulation requires the detection of phase variation between signals arriving over two different paths of the circuit. The circuit of Fig. 4 illustrates a simple adaptation of the detector of this disclosure used in a frequency modulated wave demodulator of the frequency discriminator type such as shown in Seeley's United States Patent #2,121,103 issued June 21, 1938. In this system the frequency modulated wave is set up in tuned circuit 20 and induced therefrom in tuned circuit 24 and thence in push-pull relation on the anodes P2 and P2' of tubes 12 and 12'. The frequency modulated wave is also impressed by condensers 30 and 30' in phase on the anodes P1 and P1' of tubes 10 and 10'. The cathodes K1 and K2 are connected by resistance R3 to ground and to the mid-point on the inductance of circuit 24. Cathodes K1' and K2' are similarly connected by resistance R3'. These discriminator circuits operate to provide signal voltages, at points 40 and 42 in Fig. 4, whose phase relationships are varying in accordance with the frequency variations of the impressed signal. The rectifiers 10 and 12 taken alone in cooperation with the reactive circuit or coupling comprising 20 and 24 and the non-reactive coupling 30 function to convert the frequency modulations on the wave energy into representative phase variations, detect the said variations and develop modulation voltage components across resistance R3. Rectifiers 10' and 10' with circuits 20, 24 and condenser coupling 30' function in like manner because similar phase relationships are also set up at points 44 and 46, Fig. 4.

The tubes 10, 12, 10' and 12' with their associated circuits together function in a balanced circuit to provide across R3 and R3' the modulation components which are combined differentially. Consequently, demodulation results in the detection of these phase variations, and, in Fig. 4 this is done by use of the diode phase detector of this disclosure.

It is to be understood that any form of rectifier, other than the one shown in this disclosure may be used, such as, for example, the infinite-impedance diode using triode or pentode tubes. Moreover, the frequency modulated wave impressed on circuit 20 may be derived from a radio-frequency amplifier or from an amplifier of the heterodyne type, in which case, the wave may be of intermediate frequency.

What is claimed is:

1. In a system for demodulating frequency modulated waves, an impedance on which said frequency modulated waves to be demodulated are impressed, a pair of rectifiers each having an anode and a cathode, a coupling path between said impedance and the cathodes of both of said rectifiers, a frequency selective circuit coupling said impedance to the anode of one of said rectifiers to impress frequency modulated wave energy on said anode, a non-selective circuit coupling the anode of the other of said rectifiers to said impedance, a single resistance element connected to the cathodes of both of said rectifiers and being included in said coupling path, and an output circuit coupled with said resistance.

2. In a system for demodulating frequency modulated waves, an impedance on which said frequency modulated waves to be demodulated are impressed, a first pair of rectifiers each having an anode and a cathode, a second pair of rectifiers each having an anode and a cathode, a frequency selective circuit coupled with said impedance and connected between the anodes of a rectifier of each of said pair of rectifiers to impress frequency modulated wave energy in phase opposition on said anodes, a circuit independent of frequency coupling the anodes in the other rectifier of each of said pairs of rectifiers in push-push relation to said impedance, a coupling between said impedance and the cathodes of all of said rectifiers, resistances connecting the cathodes of all of said rectifiers together and an output circuit coupled with said resistances.

3. In a detection system for modulated carrier waves, at least two rectifiers each including a cathode and anode, means for applying said waves between the anode of one rectifier and a point of fixed alternating potential, means for applying said waves in different phase relation between the anode of the second rectifier and said point, said phase relation being such that there is a component of wave voltage applied to one rectifier which is in quadrature with the wave voltage applied to the other rectifier, a resistive impedance load element common to both rectifiers and connected between the cathode of each rectifier and said point, and means for utilizing modulation voltage developed across said load element.

4. In a network for detecting relative phase deviations of two waves of the same center frequency, at least two rectifiers each including a cathode element and a cold electrode, a first wave input circuit for impressing one of the waves between the cold electrode of one rectifier and a point of relatively fixed alternating potential, a second wave input circuit for impressing the second wave between the cold electrode of the second rectifier and said point, a common load resistor connected between the cathode of each rectifier and said point, and means connected to the resistor to utilize voltage developed thereacross.

5. In a detection network for frequency modulated carrier waves, a pair of diode rectifiers, at least two resonant circuits reactively coupled in cascade and each resonant circuit being tuned to the center frequency of said waves, a capacitative coupling between the anode of one diode and one side of the first of the resonant circuits, a connection between the second diode anode and one side of the following resonant circuit, the opposite side of said first resonant circuit being established at an invariable potential, a common load resistor connecting the cathode of each diode to a point at said invariable potential, and means establishing an intermediate point of said following resonant circuit at said invariable potential.

6. In a detection system for modulated carrier waves, at least two rectifiers each including a cathode and anode, means for applying said waves between the anode of one rectifier and a point of fixed alternating potential, means for applying said waves in different phase relation between the anode of the second rectifier and said point, said phase relation being such that there is a component of wave voltage applied to one rectifier which is in quadrature with the wave voltage applied to the other rectifier, a resistive impedance load element common to both rectifiers and connected between the cathode of each rectifier and said point, and means for utilizing modulation voltage developed across said load element, said load element consisting of solely a resistor.

7. In a detection system for modulated carrier waves, at least two rectifiers each including a cathode and anode, means for applying said waves between the anode of one rectifier and a point of fixed alternating potential, means for applying said waves in different phase relation between the anode of the second rectifier and said point, said phase relation being such that there is a component of wave voltage applied to one rectifier which is in quadrature with the wave voltage applied to the other rectifier, a resistive impedance load element common to both rectifiers and connected between the cathode of each rectifier and said point, and means for utilizing modulation voltage developed across said load element, and said applying means for both rectifiers consisting of a common resonant network tuned to the center frequency of said waves.

8. In a network for detecting relative phase deviations of two waves of the same center frequency, at least two rectifiers each including at least a cathode electrode and a cold electrode, a first wave input circuit for impressing one of said waves between one electrode of one rectifier and a point of relatively invariable potential, a second wave input circuit for impressing the second wave between a like one electrode of the second rectifier and said point, a common load impedance connected between the like second electrodes of each of said rectifiers and said point, and means connected to said load impedance to utilize voltage developed thereacross.

ROBERT E. SCHOCK.